US009537660B2

United States Patent
Wang et al.

(10) Patent No.: US 9,537,660 B2
(45) Date of Patent: Jan. 3, 2017

(54) METHOD OF ESTABLISHING PUBLIC KEY CRYPTOGRAPHIC PROTOCOLS AGAINST QUANTUM COMPUTATIONAL ATTACK

(71) Applicants: Weijian Wang, Shenzhen, Guangdong (CN); Xiaofeng Wang, Shenzhen, Guangdong (CN)

(72) Inventors: Weijian Wang, Shenzhen (CN); Xiaofeng Wang, Shenzhen (CN); Hanling Lin, Shenzhen (CN); Xiaoyang Wang, Yibin (CN)

(73) Assignees: Weijian Wang, Shenzhen (CN); Xiaofeng Wang, Shenzhen (CN)

( * ) Notice: Subject to any disclaimer, the term of this patent is extended or adjusted under 35 U.S.C. 154(b) by 114 days.

(21) Appl. No.: 14/450,305

(22) Filed: Aug. 4, 2014

(65) Prior Publication Data

US 2015/0055777 A1 Feb. 26, 2015

(30) Foreign Application Priority Data

Aug. 21, 2013 (CN) .......................... 2013 1 0382299

(51) Int. Cl.
*H04L 9/32* (2006.01)
*H04L 9/08* (2006.01)
*H04L 9/30* (2006.01)
*H04L 9/00* (2006.01)

(52) U.S. Cl.
CPC ............ *H04L 9/3247* (2013.01); *H04L 9/002* (2013.01); *H04L 9/0844* (2013.01); *H04L 9/0852* (2013.01); *H04L 9/302* (2013.01); *H04L 9/3013* (2013.01); *H04L 9/3271* (2013.01); *H04L 2209/72* (2013.01)

(58) Field of Classification Search
CPC ............. H04L 9/00; H04L 9/002; H04L 9/08; H04L 9/0811; H04L 9/0816; H04L 9/0838; H04L 9/0841; H04L 9/0844; H04L 9/0852; H04L 9/30; H04L 9/3013; H04L 9/302; H04L 9/306; H04L 9/3066; H04L 9/32; H04L 9/3218; H04L 9/3247; H04L 9/3271; H04L 2209/72
See application file for complete search history.

(56) References Cited

U.S. PATENT DOCUMENTS

| 6,785,813 | B1* | 8/2004 | Vanstone | H04L 9/0841 380/30 |
|---|---|---|---|---|
| 7,136,484 | B1* | 11/2006 | Koh | H04L 9/0662 380/28 |
| 7,401,226 | B2* | 7/2008 | Girault | H04L 9/3221 713/180 |
| 2002/0001382 | A1* | 1/2002 | Anshel | H04L 9/0841 380/30 |
| 2008/0260143 | A1* | 10/2008 | Ibrahim | G06F 7/725 380/28 |
| 2008/0301459 | A1* | 12/2008 | Ebeid | H04L 9/003 713/180 |
| 2010/0020964 | A1* | 1/2010 | Horie | G06F 7/725 380/44 |
| 2010/0205443 | A1* | 8/2010 | Zhao | H04L 9/3218 713/171 |
| 2014/0064491 | A1* | 3/2014 | Ghouti | H04L 9/3013 380/282 |

OTHER PUBLICATIONS

Shpilrain et al., Thompson's Group and Public Key Cryptography, 2005, ACNS 2005, LNCS 3531, Springer-Verlag Berlin Heidelberg 2005, pp. 151-163.*
Xiaofeng Wang et al., Double shielded Public Key Cryptosystems, 2014, Cryptology ePrint Archive: Report 2014/558, pp. 1-14.*
Translation of PCT report on patentabiliy for PCT/CN2013/001119, 2014, pp. 1-6.*

* cited by examiner

*Primary Examiner* — Jung Kim
*Assistant Examiner* — Adrian Stoica

(57) ABSTRACT

The present invention relates to information security and discloses a method of establishing public key cryptographic protocols against the quantum computational attack. The method includes the following steps: definition of an infinite non-abelian group G; choosing two private keys in G by two entities; a second entity computing y, and sending y to a first entity; the first entity computing x and z, and sending (x, z) to the second entity; the second entity computing w and v, and sending (w, v) to the first entity; the first entity computing u, and sending u to the second entity; and the first entity computing $K_A$, and the second entity computing $K_B$, thereby reaching a shared key $K=K_A=K_B$. The security guarantee of a public key cryptographic algorithm created by the present invention relies on unsolvability of a problem, and has an advantage of free of the quantum computational attack.

6 Claims, No Drawings

METHOD OF ESTABLISHING PUBLIC KEY CRYPTOGRAPHIC PROTOCOLS AGAINST QUANTUM COMPUTATIONAL ATTACK

CROSS REFERENCE TO RELATED APPLICATIONS

This application claims priority of Chinese patent application No. 201310382299.7 filed on Aug. 21, 2013, the entire content of which are hereby incorporated by reference.

BACKGROUND

Technical Field

The present invention relates to the field of information security, and in particular, to a cryptogram technology for establishing public key cryptographic protocols against the quantum computational attack.

Related Art

The verification for a real identity of a person who sends and receives information, and the non-repudiation of the sent/received information after the information is sent or received and the guarantee of the integrity of data are two important issues about the theme of modern cryptography.

Disclosure of a key cryptogram system presents excellent answers to the issues of the two aspects, and more new ideas and solutions are being generated continually. In a public key system, an encryption key is different from a decryption key. People bring an encryption key to public, so that anyone can use the encryption key; but a decryption key is only known by a person performing decryption. In modern periods, the security of a public key cryptosystem is almost based on two categories of mathematic problems that are considered to be difficult to compute, a first category being a decomposition problem of a big prime number, for example, an RSA algorithm; and a second category being a discrete logarithm problem, for example, a key exchange algorithm of Diffie-Hellman, an El Gamal algorithm, an elliptic curve public key cryptographic algorithm (ECC for short), and the like.

SUMMARY

In order to solve a problem that a hidden trouble exists in identity verification and security of data guarantee based on an existing public key cryptographic protocol, an objective of the present invention is to establish public key cryptographic protocols technology capable of resisting various known attacks, and provide various application protocols on this basis.

One manner for implementing the objective of the present invention is: a method of establishing public key cryptographic protocols against the quantum computational attack, which includes a method for generating a shared key. The method for generating a shared key is also referred to as generating a shared key protocol, and the method for generating a shared key includes the following steps:

(11) establishing an infinite non-abelian group G and two subgroups A and B of G, so that for any $a \in A$ and any $b \in B$, the equation $ab=ba$ is true;

(12) choosing, by a first entity of a protocol, an element g in G, where the first entity of the protocol chooses two elements $b_1, b_2 \in A$ as private keys, and a second entity of the protocol chooses two elements $d_1, d_2 \in B$ as private keys;

(13) choosing, by the second entity of the protocol, two elements $c_1, c_2 \in B$, computing $y=d_1 c_1 g c_2 d_2$, and sending y to the first entity of the protocol;

(14) choosing, by the first entity of the protocol, four elements $a_1, a_2, b_3, b_4 \in A$, computing $$x = b_1 a_1 g a_2 b_2 \text{ and } z = b_3 a_1 y a_2 b_4 = b_3 a_1 d_1 c_1 g c_2 d_2 a_2 b_4,$$

and sending (x, z) to the second entity of the protocol;

(15) choosing, by the second entity of the protocol, two elements $d_3, d_4 \in B$, computing $$w = d_3 c_1 x c_2 d_4 = d_3 c_1 b_1 a_1 g a_2 b_2 c_2 d_4$$

and $$v = d_1^{-1} z d_2^{-1} = d_1^{-1} b_3 a_1 d_1 c_1 g c_2 d_2 a_2 b_4 d_2^{-1} = b_3 a_1 c_1 g c_2 a_2 b_4$$

and sending (w, v) to the first entity of the protocol;

(16) computing, by the first entity of the protocol, $$u = b_1^{-1} w b_2^{-1} = b_1^{-1} d_3 c_1 b_1 a_1 g a_2 b_2 c_2 d_4 b_2^{-1} = d_3 c_1 a_1 g a_2 c_2 d_4,$$

and sending u to the second entity of the protocol; and

(17) computing, by the first entity of the protocol, $K_A = b_3^{-1} v b_4^{-1} = a_1 c_1 g c_2 a_2$, and computing, by the second entity of the protocol, $K_B = d_3^{-1} u d_4^{-1} = c_1 a_1 g a_2 c_2$;

because $a_1, a_2 \in A$, and $c_1, c_2 \in B$, $a_1$ and $c_1$ are separately commute with $a_2$ and $c_2$ in multiplication, so that the first entity of the protocol and the second entity of the protocol reach a shared key $K=K_A=K_B$.

In the present invention, an algebra system in which an unsolvable problem exists is first established theoretically, and second, the unsolvability of the problem is used as security guarantee to establish a public key cryptographic algorithm. The security of the algorithm and the equivalence of the unsolvable problem of the present invention prove that the present invention is immune to the quantum computational attack and the like. Because the method of establishing public key cryptographic protocols of the present invention uses an unsolvable decision problem as the security guarantee, the method is powerfully guaranteed both theoretically and in an actual application aspect, and compared with the prior art, has the following advantages:

1. The security guarantee of a built public key cryptographic algorithm relies on the unsolvability of the problem rather than the computation difficulty of the problem, (a classic public key cryptographic algorithm is based on the computation difficulty);

2. That the security of the public key cryptographic algorithm of the present invention is equivalent to the unsolvability of the problem on which the public key cryptographic algorithm relies has been proved mathematically;

3. The public key cryptographic algorithm of the present invention resists the quantum computational attack.

DETAILED DESCRIPTION

The following further describes in detail establishment of public key cryptographic protocols against the quantum computational attack according to the present invention with reference to embodiments.

1. A Platform for Establishing Public Key Cryptographic Protocols

A platform for establishing all public key cryptographic protocols is an infinite non-abelian group G and two subgroups A and B of G, so that for any $a \in A$ and any $b \in B$, the equation ab=ba is true. In addition, because of demands of encoding and key generating, G must further satisfy the following conditions:

1) Any word in terms of generators of G representing an element of G has an unique computable normal form;

2) G at least is in exponential growth, that is, the number of elements whose word length is a positive integer n in G is confined to an exponential function about n;

3) Multiplication and inversion of a group based on the normal form is computable.

Therefore, a braid group $B_n$ with $n \geq 12$ is taken as the infinite non-abelian group G, where $B_n$ has the foregoing properties and is a group defined by the following presentation:

$$B_n = \langle \sigma_1, \sigma_2, \ldots, \sigma_{n-1} | \sigma_i \sigma_j = \sigma_j \sigma_i, |i-j| \geq 2,$$
$$\sigma_i \sigma_{i+1} \sigma_i = \sigma_{i+1} \sigma_i \sigma_{i+1}, 1 \leq i \leq n-2 \rangle,$$

the braid group $B_n$ contains the following two subgroups: let $m = \lfloor n/2 \rfloor$ be a maximum integer not greater than $n/2$, and a left braid $LB_n$ and a right braid $RB_n$ of the braid group $B_n$ separately are $$LB_n = \langle \sigma_1, \sigma_2, \ldots, \sigma_{m-1} \rangle \text{ and } RB_n = \langle \sigma_{m+1}, \sigma_{m+2}, \ldots, \sigma_{n-1} \rangle$$

that is, separately are subgroups generated by $\sigma_1, \sigma_2, \ldots, \sigma_{m-1}$ and $\sigma_{m+1}, \sigma_{m+2}, \ldots, \sigma_{n-1}$, and for any $a \in LB_n$ and any $b \in RB_n$, ab=ba is true.

When $n \geq 12$, $LB_n$ and $RB_n$ separately contain a subgroup isomorphic to the direct product of $F_2 \times F_2$, that is, two free groups with ranks being 2:

$$LA = \langle \sigma_{m-5}^2, \sigma_{m-4}^2, \sigma_{m-2}^2, \sigma_{m-1}^2 \rangle \leq LB_n$$

and $$RA = \langle \sigma_{m+1}^2, \sigma_{m+2}^2, \sigma_{m+4}^2, \sigma_{m+5}^2 \rangle \leq RB_n,$$

and then a finite presentation group H whose word problem is unsolvable and that is generated by two elements constructs a Mihailova subgroup $M_{LA}(H)$ of LA and a Mihailova subgroup $M_{RA}(H)$ of RA again; the following is 56 generators of $M_{LA}(H)$, where $i=m-5$; and when $i=m+1$, 56 generators of $M_{RA}(H)$ can be obtained:

$$\sigma_i^2 \sigma_{i+3}^2, \sigma_{i+1}^2 \sigma_{i+4}^2, S_{ij}, T_{ij}, j=1,2,\ldots,27$$

and 27 $S_{ij}$s are (all $\sigma_i$s in the following each $S_{ij}$ are replaced with $\sigma_{i+3}$s, and all $\sigma_{i+1}$s are replaced with $\sigma_{i+4}$s to obtain corresponding 27 $T_{ij}$s, where $j=1, 2, \ldots, 27$):

$$S_{i1}: (\sigma_i^2 \sigma_{i+1}^2 \sigma_i^{-2} \sigma_{i+1}^2 \sigma_i^4 \sigma_{i+1}^{-2} \sigma_i^{-2} \sigma_{i+1}^{-2} \sigma_i^2 \sigma_{i+1}^2 \sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{12})^{-1}$$
$$\sigma_{i+1}^{-12} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14} (\sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14})^9$$
$$\sigma_i^{-4} \sigma_{i+1}^{-2} \sigma_i^2 \sigma_{i+1}^2 \sigma_i^{-2} \sigma_{i+1}^2 \sigma_i^4 \sigma_{i+1}^{-2} \sigma_i^{-2} \sigma_{i+1}^2 \sigma_i^2$$

$$S_{i2}: (\sigma_i^2 \sigma_{i+1}^2 \sigma_i^{-2} \sigma_{i+1}^4 \sigma_i^4 \sigma_{i+1}^{-4} \sigma_i^{-2} \sigma_{i+1}^{-2} \sigma_i^2 \sigma_{i+1}^4 \sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{10})^{-1}$$
$$\sigma_{i+1}^{-10} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14} (\sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14})^9$$
$$\sigma_i^{-4} \sigma_{i+1}^{-4} \sigma_i^2 \sigma_{i+1}^2 \sigma_i^{-2} \sigma_{i+1}^4 \sigma_i^4 \sigma_{i+1}^{-4} \sigma_i^{-2} \sigma_{i+1}^2 \sigma_i^2$$

$$S_{i3}: (\sigma_i^2 \sigma_{i+1}^2 \sigma_i^{-2} \sigma_{i+1}^6 \sigma_i^4 \sigma_{i+1}^{-6} \sigma_i^{-2} \sigma_{i+1}^{-2} \sigma_i^2 \sigma_{i+1}^6 \sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{8})^{-1}$$
$$\sigma_{i+1}^{-8} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14} (\sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14})^9$$
$$\sigma_i^{-4} \sigma_{i+1}^{-6} \sigma_i^2 \sigma_{i+1}^2 \sigma_i^{-2} \sigma_{i+1}^6 \sigma_i^4 \sigma_{i+1}^{-6} \sigma_i^{-2} \sigma_{i+1}^2 \sigma_i^2$$

$$S_{i4}: (\sigma_i^2 \sigma_{i+1}^2 \sigma_i^{-2} \sigma_{i+1}^8 \sigma_i^4 \sigma_{i+1}^{-8} \sigma_i^{-2} \sigma_{i+1}^{-2} \sigma_i^2 \sigma_{i+1}^8 \sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{6})^{-1}$$
$$\sigma_{i+1}^{-6} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14} (\sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14})^9$$
$$\sigma_i^{-4} \sigma_{i+1}^{-8} \sigma_i^2 \sigma_{i+1}^2 \sigma_i^{-2} \sigma_{i+1}^8 \sigma_i^4 \sigma_{i+1}^{-8} \sigma_i^{-2} \sigma_{i+1}^2 \sigma_i^2$$

$$S_{i5}: (\sigma_i^2 \sigma_{i+1}^2 \sigma_i^{-2} \sigma_{i+1}^{10} \sigma_i^4 \sigma_{i+1}^{-10} \sigma_i^{-2} \sigma_{i+1}^{-2} \sigma_i^2 \sigma_{i+1}^{10} \sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{4})^{-1}$$
$$\sigma_{i+1}^{-4} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14} (\sigma_i^{-4} \sigma_{i+1}^{-14} \sigma_i^2 \sigma_{i+1}^2 \sigma_i^{-2} \sigma_{i+1}^{14} \sigma_i^4 \sigma_{i+1}^{-14} \sigma_i^{-2} \sigma_{i+1}^{-2} \sigma_i^2 \sigma_{i+1}^{14})^9$$
$$\sigma_i^{-4} \sigma_{i+1}^{-10} \sigma_i^2 \sigma_{i+1}^2 \sigma_i^{-2} \sigma_{i+1}^{10} \sigma_i^4 \sigma_{i+1}^{-10} \sigma_i^{-2} \sigma_{i+1}^2 \sigma_i^2$$

$$S_{i6}: (\sigma_i^2 \sigma_{i+1}^2 \sigma_i^{-2} \sigma_{i+1}^2 \sigma_i^4 \sigma_{i+1}^{-2} \sigma_i^{-2} \sigma_{i+1}^{-2} \sigma_i^2 \sigma_{i+1}^2 (\sigma_i^{-4} \sigma_{i+1}^{-16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16})^9$$
$$\sigma_i^{-4} \sigma_{i+1}^{16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{14})^{-1}$$
$$\sigma_{i+1}^{-14} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16} \sigma_i^{-4} \sigma_{i+1}^{-2} \sigma_i^2 \sigma_{i+1}^2 \sigma_i^{-2} \sigma_{i+1}^2 \sigma_i^4 \sigma_{i+1}^{-2} \sigma_i^{-2} \sigma_{i+1}^{-2} \sigma_i^2$$

$$S_{i7}: (\sigma_i^2 \sigma_{i+1}^4 \sigma_i^{-2} \sigma_{i+1}^4 \sigma_i^4 \sigma_{i+1}^{-4} \sigma_i^{-2} \sigma_{i+1}^{-2} \sigma_i^2 \sigma_{i+1}^4 (\sigma_i^{-4} \sigma_{i+1}^{-16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16})^9$$
$$\sigma_i^{-4} \sigma_{i+1}^{-16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{12})^{-1}$$
$$\sigma_{i+1}^{-12} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16} \sigma_i^{-4} \sigma_{i+1}^{-4} \sigma_i^2 \sigma_{i+1}^2 \sigma_i^{-2} \sigma_{i+1}^4 \sigma_i^4 \sigma_{i+1}^{-4} \sigma_i^{-2} \sigma_{i+1}^{-2} \sigma_i^2$$

$$S_{i8}: (\sigma_i^2 \sigma_{i+1}^6 \sigma_i^{-2} \sigma_{i+1}^6 \sigma_i^4 \sigma_{i+1}^{-6} \sigma_i^{-2} \sigma_{i+1}^{-2} \sigma_i^2 \sigma_{i+1}^6 (\sigma_i^{-4} \sigma_{i+1}^{-16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16})^9$$
$$\sigma_i^{-4} \sigma_{i+1}^{-16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{10})^{-1}$$
$$\sigma_{i+1}^{-10} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16} \sigma_i^{-4} \sigma_{i+1}^{-6} \sigma_i^2 \sigma_{i+1}^2 \sigma_i^{-2} \sigma_{i+1}^6 \sigma_i^4 \sigma_{i+1}^{-6} \sigma_i^{-2} \sigma_{i+1}^{-2} \sigma_i^2$$

$$S_{i9}: (\sigma_i^2 \sigma_{i+1}^8 \sigma_i^{-2} \sigma_{i+1}^8 \sigma_i^4 \sigma_{i+1}^{-8} \sigma_i^{-2} \sigma_{i+1}^{-2} \sigma_i^2 \sigma_{i+1}^8 (\sigma_i^{-4} \sigma_{i+1}^{-16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16})^9$$
$$\sigma_i^{-4} \sigma_{i+1}^{-16} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{8})^{-1}$$
$$\sigma_{i+1}^{-8} \sigma_i^2 \sigma_{i+1}^2 \sigma_i^{-2} \sigma_{i+1}^{16} \sigma_i^4 \sigma_{i+1}^{-16} \sigma_i^{-2} \sigma_{i+1}^{-2} \sigma_i^2 \sigma_{i+1}^{16} \sigma_i^{-4} \sigma_{i+1}^{-8} \sigma_i^2 \sigma_{i+1}^2 \sigma_i^{-2} \sigma_{i+1}^2 \sigma_i^4 \sigma_{i+1}^{-2} \sigma_i^{-2} \sigma_{i+1}^{-2} \sigma_i^2$$

-continued $S_{i,10}: (\sigma_i^2\sigma_{i+1}^{10}\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^6)^{-1}$
$\sigma_{i+1}^{-6}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2$ $S_{i,11}: (\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{16})^{-1}$
$\sigma_{i+1}^{-16}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2$ $S_{i,12}: (\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{14})^{-1}$
$\sigma_{i+1}^{-14}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2$ $S_{i,13}: (\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{12})^{-1}$
$\sigma_{i+1}^{-12}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2$ $S_{i,14}: (\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{10})^{-1}$
$\sigma_{i+1}^{-10}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2$ $S_{i,15}: (\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^8)^{-1}$
$\sigma_{i+1}^{-8}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2$ $S_{i,16}: (\sigma_{i+1}^{-6}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-20}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^6$ $S_{i,17}: (\sigma_{i+1}^{-4}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-20}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^4$ $S_{i,18}: (\sigma_i^{-4}\sigma_{i+1}^{-12}\sigma_i^2\sigma_{i+1}^2\sigma_i^{-2}\sigma_{i+1}^{12}\sigma_i^4\sigma_{i+1}^{-12}\sigma_i^{-2}\sigma_{i+1}^{-2}\sigma_i^2\sigma_{i+1}^{10}\sigma_i^{-2}\sigma_{i+1}^{-2}\sigma_i^2\sigma_{i+1}^2\sigma_i^{-4}\sigma_{i+1}^{-2}\sigma_i^2\sigma_{i+1}^2\sigma_i^{-2}\sigma_{i+1}^{-2}\sigma_i^4$
$\sigma_{i+1}^{-2}\sigma_i^{-2}\sigma_{i+1}^2\sigma_i^2\sigma_{i+1}^2\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^2\sigma_i^2\sigma_{i+1}^2\sigma_i^{-4}\sigma_{i+1}^{-2}\sigma_i^2\sigma_{i+1}^2\sigma_i^{-2}\sigma_{i+1}^{-2}\sigma_i^{-2}\sigma_{i+1}^{-18}\sigma_i^2$
$\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^2$
$\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2)^{-1}$
$(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^{-2}\sigma_i^{-2}\sigma_{i+1}^{-2}\sigma_i^2\sigma_{i+1}^2\sigma_i^2\sigma_i^{-4}\sigma_{i+1}^{-2}\sigma_i^2\sigma_{i+1}^{-2}\sigma_i^{-2}\sigma_{i+1}^{-18}\sigma_i^2$
$\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3$
$\sigma_i^{-4}\sigma_{i+1}^{-12}\sigma_i^2\sigma_{i+1}^2\sigma_i^{-2}\sigma_{i+1}^{12}\sigma_i^4\sigma_{i+1}^{-12}\sigma_i^{-2}\sigma_{i+1}^{-2}\sigma_i^2\sigma_{i+1}^{10}$ $S_{i,19}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}$
$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}$
$\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,20}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^2$
$\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}$
$\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^2\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,21}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^3$
$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^2\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^2$
$\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^3\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ -continued $$S_{i,22}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^4$$
$$\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^3\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$$
$$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^3$$
$$\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^4\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$$

$$S_{i,23}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^5$$
$$\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6$$
$$\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^4$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$$
$$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^4$$
$$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^5\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$$

$$S_{i,24}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^6$$
$$\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$$
$$\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^5$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$$
$$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^5$$
$$\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-10}\sigma_i^2\sigma_{i+1}^2\sigma_i^{-3}\sigma_{i+1}^{10}\sigma_i^4\sigma_{i+1}^{-10}\sigma_i^{-2}\sigma_{i+1}^{-2}\sigma_i^2\sigma_{i+1}^{10}$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^6\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$$

$$S_{i,25}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^7$$
$$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$$
$$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^6\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$$
$$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^6$$
$$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$$
$$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^7\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$$

$$S_{i,26}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^8$$
$$(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^7$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$$
$$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^7$$
$$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^8\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$$

$$S_{i,27}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$$
$$(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^8$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$$
$$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^8$$
$$\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$$

2. An Embodiment for Establishing Core Protocol 1 of Public Key Cryptographic Protocols System:

In this embodiment, two entities of the protocol are separately Alice and Bob,

1) Alice and Bob jointly choose an element g in $B_n$, Alice chooses two elements $b_1$, $b_2 \in LB_n$ as private keys, and Bob chooses two elements $d_1$, $d_2 \in RB_n$ as private keys;

2) Bob chooses two elements $c_1$, $c_2 \in RB_n$, computes $y=d_1c_1gc_2d_2$, and sends y to Alice;

3) Alice chooses four elements $a_1$, $a_2$, $b_3$, $b_4 \in LB_n$, computes $$x=b_1a_1ga_2b_2 \text{ and } z=b_3a_1ya_2b_4=b_3a_1d_1c_1gc_2d_2a_2b_4,$$

and sends (x, z) to Bob;

4) Bob chooses two elements $d_3$, $d_4 \in RB_n$, computes $$w=d_3c_1xc_2d_4=d_3c_1b_1a_1ga_2b_2c_2d_4$$

and $$v=d_1^{-1}zd_2^{-1}=d_1^{-1}b_3a_1d_1c_1gc_2d_2a_2b_4d_2^{-1}=b_3a_1c_1gc_2a_2b_4,$$

and sends (w, v) to Alice; and

5) Alice computes $$u=b_1^{-1}wb_2^{-1}=b_1^{-1}d_3c_1b_1a_1ga_2b_2c_2d_4b_2^{-1}=d_3c_1a_1ga_2c_2d_4,$$

and sends u to Bob,

In step 4) of the foregoing protocol, because $d_1$, $d_2 \in RB_n$, and $a_1$, $a_2$, $b_3$, $b_4 \in LB_n$, $d_1^{-1}$ and $d_2^{-1}$ separately commute with $b_3$ and $a_1$ and with $b_4$ and $a_2$ in multiplication, so that a final equation in the step is obtained. Likewise, a final equation in step 5) is obtained.

On the Basis of this Embodiment, an Exemplary Embodiment for Establishing a Key Exchange Protocol is:

The following procedures are performed after the five steps in the core protocol:

6) Alice computes $K_A=b_3^{-1}vb_4^{-1}=a_1c_1gc_2d_2$ and Bob computes $K_B=d_3^{-1}ud_4^{-1}=c_1a_1ga_2c_2$.

Because $a_1$, $a_2 \in LB_n$, and $c_1$, $c_2 \in RB_n$, $a_1$ and $c_1$ separately commute with $a_2$ and $c_2$ in multiplication, so that Alice and Bob reach a shared key $K=K_A=K_B$.

On the Basis of this Embodiment, an Exemplary Embodiment for Establishing a Data Encryption Protocol is:

It is given that to-be-encrypted plaintext information (encoded) is $m \in \{0, 1\}^k$ (that is, a 0-1 string with a length of k), and it is given that $\Theta: B_n \to \{0, 1\}^k$ is a collision-resistant Hash function from the group $B_n$ to a plaintext space $\{0, 1\}^k$. The private keys of Alice are $(B_n, LB_n, RB_n, g, \Theta)$, and $a_1$, $a_2$, $b_1$, $b_2$, $b_3$, $b_4 \in LB_n$ are chosen, and the private keys are $b_1$ and $b_2$. Bob chooses $c_1$, $c_2$, $d_1$, $d_2$, $d_3$, $d_4 \in RB_n$, and uses $d_1$ and $d_2$ as the private keys. The following procedures are performed after the five steps in the core protocol:

6) Encrypting: Bob first computes $K_B=d_3^{-1}ud_4^{-1}=c_1a_1ga_2c_2$, then computes (encrypts) $t=\Theta(K_B) \oplus m$, uses t as ciphertext, and sends the ciphertext to Alice. $\oplus$ herein is the exclusive or operation.

7) Decrypting: Alice first computes $K_A=b_3^{-1}vb_4^{-1}=a_1c_1gc_2a_2$, then computes (decrypts)

$$m'=\Theta(K_A) \oplus t=\Theta(K_A) \oplus (\Theta(K_B) \oplus m)$$

verification of m'=m: $K_A=K_B$ is known according to a key exchange protocol, and therefore, $$m'=\Theta(K_A) \oplus (\Theta(K_B) \oplus m)=\Theta(K_B) \oplus (\Theta(K_B) \oplus m)=(\Theta(K_B) \oplus \Theta(K_B)) \oplus m=m.$$

On the Basis of this Embodiment, an Exemplary Embodiment for Establishing a Digital Signature Protocol is:

It is given that to-be-encrypted plaintext information (encoded) is m, and it is given that $\Theta: B_n \to \{0, 1\}^k$ is a collision-resistant Hash function. The public keys of Alice are $(B_n, LB_n, RB_n, g, \Theta)$, and $a_1$, $a_2$, $b_1$, $b_2$, $b_3$, $b_4 \in LB_n$ are chosen, and the private keys are $b_1$ and $b_2$. Bob chooses $c_1$, $c_2$, $d_1$, $d_2$, $d_3$, $d_4 \in RB_n$, and uses $d_1$ and $d_2$ as the private keys. The following procedures are performed after the five steps in the core protocol:

6) Signing: Alice computes $K_A=b_3^{-1}vb_4^{-1}=a_1c_1gc_2a_2$ and $S=\Theta(mK_A)$, and Alice uses S as a signature of Alice for a file m and sends (S, m) to Bob.

7) Verifying: Bob computes $K_B=d_3^{-1}ud_4^{-1}=c_1a_1ga_2c_2$ and $S'=\Theta(mK_B)$, and if $S'=S$, Bob acknowledges that S is the signature of Alice for the file m; otherwise, Bob refuses to accept that S is the signature of Alice for the file m.

On the Basis of this Embodiment, an Exemplary Embodiment for an Identity Authentication Protocol on the Basis of the Core Protocol is:

Alice chooses an element g in $B_n$, four elements $a_1$, $a_2$, $b_1$, $b_2 \in LB_n$, and a collision-resistant Hash function $\Theta: B_n \to \{0, 1\}^k$, and computes $x=b_1a_1ga_2b_2$. The public keys of Alice are $(B_n, LB_n, RB_n, g, x, \Theta)$, and the private keys are $b_1$ and An authentication process is:

It is given that Alice is a prover and Bob is a verifier.

1) Bob chooses six elements $c_1$, $c_2$, $d_1$, $d_2$, $d_3$, $d_4 \in RB_n$, the private keys are $d_1$ and $d_2$. Bob computes $$y=d_1c_1gc_2d_2 \text{ and } w=d_3c_1xc_2d_4,$$

uses (y, w) as challenge 1, and sends the challenge 1 to Alice;

2) Alice chooses two elements $b_3$, $b_4 \in LB_n$, computes $$z=b_3a_1ya_2b_4 \text{ and } u=b_1^{-1}wb_2^{-1}=d_3c_1a_1ga_2c_2d_4,$$

uses (z, u) as a response, and sends the response to Bob;

3) Bob computes $v=d_1^{-1}zd_2^{-1}=b_3a_1c_1gc_2a_2b_4$, uses v as challenge 2, and sends the challenge 2 to Alice;

4) Alice computes $t=\Theta(b_3^{-1}vb_4^{-1})=\Theta(a_1c_1gc_2a_2)$, uses t as a commitment, and sends the commitment to Bob;

5) Bob computes $t'=\Theta(d_3^{-1}ud_4^{-1})=\Theta(c_1a_1ga_2c_2)$, and verifies whether $t=t'$, and if $t=t'$, Bob acknowledges an identity of Alice; otherwise, Bob refuses to acknowledge the identity.

3. An Embodiment for Establishing Core Protocol 2 of Public Key Cryptographic Protocols System:

In this embodiment, two entities of the protocol are separately Alice and Bob, 1.1) Alice and Bob jointly choose an element g in $B_n$, Alice chooses two elements $b_1 \in LB_n$ and $d_2 \in RB_n$ as private keys, and Bob chooses two elements $b_2 \in LB_n$ and $d_1 \in RB_n$ as private keys;

2.1) Bob chooses two elements $a_2 \in LB_n$ and $c_1 \in RB_n$, computes $y=d_1c_1ga_2b_2$, and sends y to Alice;

3.1) Alice chooses four elements $a_1$, $b_4 \in LB_n$ and $c_2$, $d_4 \in RB_n$, computes $$x=b_1a_1gc_2d_2 \text{ and } z=b_4a_1yc_2d_4=b_4a_1d_1c_1ga_2b_2c_2d_4,$$

and sends (x, z) to Bob;

4.1) Bob chooses two elements $b_3 \in LB_n$, and $d_3 \in RB_n$, computes $$w=d_3c_1xa_2b_3=d_3c_1b_1a_1gc_2d_2a_2b_3$$

and $$v=d_1^{-1}zb_2^{-1}=d_1^{-1}b_4a_1d_1c_1ga_2b_2c_2d_4b_2^{-1}=b_4a_1c_1ga_2c_2d_4,$$

and sends (w, v) to Alice; and 5.1) Alice computes $$u = b_1^{-1} w d_2^{-1} = b_1^{-1} d_3 c_1 b_1 a_1 g c_2 d_2 a_2 b_3 d_2^{-1} = d_3 c_1 a_1 g c_2 a_2 b_3,$$

and sends u to Bob;

In step 4) of the foregoing protocol, because $d_1, d_2 \in RB_n$ and $a_1, a_2, b_3, b_4 \in LB_n$, $d_1^{-1}, d_2^{-1}$ separately commute with $b_3$ and $a_1$, and with $b_4$ and $a_2$ in multiplication, so that a final equation in the step is obtained. Likewise, a final equation in step 5) is obtained.

3.3 An application protocol

The following application protocol is established on the basis of the core protocol.

On the Basis of this Embodiment, an Exemplary Embodiment for Establishing a Key Exchange Protocol is:

the following procedures are performed after the five steps in the core protocol:

6.1) Alice computes $K_A = b_4^{-1} v d_4^{-1} = a_1 c_1 g a_2 c_2$ and Bob computes $$K_B = d_3^{-1} u b_3^{-1} = c_1 a_1 g c_2 a_2.$$

Because $a_1, a_2 \in LB_n$, and $c_1, c_2 \in RB_n$, $a_1$ and $c_1$ are separately commute with $a_2$ and $c_2$ in multiplication, so that Alice and Bob reach a shared key $K = K_A = K_B$.

On the Basis of this Embodiment, an Exemplary Embodiment for Establishing a Data Encryption Protocol is:

It is given that to-be-encrypted plaintext information (encoded) is $m \in \{0, 1\}^k$ (that is, a 0-1 string with a length of k), and it is given that $\Theta: B_n \rightarrow \{0, 1\}^k$ is a collision-resistant Hash function from the group $B_n$ to a plaintext space $\{0, 1\}^k$. The public keys of Alice are $(B_n, LB_n, RB_n, g, \Theta)$, $a_1, b_1, b_4 \in LB_n$ and $c_2, d_2, d_4 \in RB_n$ are chosen, and the private keys are $b_1$ and $d_2$. Bob chooses $a_2, b_2, b_3 \in LB_n$ and $c_1, d_1, d_3 \in RB_n$, and uses $d_1$ and $b_2$ as the private keys. The following procedures are performed after the five steps in the core protocol:

6.1) Encrypting: Bob first computes $K_B = d_3^{-1} u b_3^{-1} = c_1 a_1 g c_2 a_2$, then computes (encrypts) $t = \Theta(K_B) \oplus m$, uses t as ciphertext, and sends the ciphertext to Alice. $\oplus$ herein is the exclusive or operation.

7.1) Decrypting: Alice first computes $K_A = b_4^{-1} v d_4^{-1} = a_1 c_1 g a_2 c_2$, then computes (decrypts)

$$m' = \Theta(K_A) \oplus t = \Theta(K_A) \oplus (\Theta(K_B) \oplus m)$$

verification of m'=m: $K_A = K_B$ is known according to a key exchange protocol, and therefore, $$m' = \Theta(K_A) \oplus (\Theta(K_B) \oplus m) = \Theta(K_B) \oplus (\Theta(K_B) \oplus m) = (\Theta(K_B) \oplus \Theta(K_B)) \oplus m = m.$$

On the Basis of this Embodiment, an Exemplary Embodiment for Establishing a Digital Signature Protocol is:

It is given that to-be-encrypted plaintext information (encoded) is m, and it is given that $\Theta: B_n \rightarrow \{0, 1\}^k$ is a collision-resistant Hash function. The public keys of Alice are $(B_n, LB_n, RB_n, g, \Theta)$, $a_1, b_1, b_4 \in LB_n$ and $c_2, d_2, \in RB_n$ are chosen, and the private keys are $b_1$ and $d_2$. Bob chooses $a_2, b_2, b_3 \in LB_n$ and $c_1, d_1, d_3 \in RB_n$, and uses $d_1$ and $b_2$ as the private keys. The following procedures are performed after the five steps in the core protocol:

6.1) Signing: Alice computes $K_A = b_4^{-1} v d_4^{-1} = a_1 c_1 g a_2 c_2$ and $S = \Theta(mK_A)$, and Alice uses S as a signature of Alice for a file m and sends (S, m) to Bob.

6.2) Verifying: Bob computes $K_B = d_3^{-1} u b_3^{-1} = c_1 a_1 g c_2 a_2$ and $S' = \Theta(mK_B)$, and if S'=S, Bob acknowledges that S is the signature of Alice for the file m; otherwise, Bob refuses to accept that S is the signature of Alice for the file m.

On the Basis of this Embodiment, an Exemplary Embodiment for an Identity Authentication Protocol on the Basis of the Core Protocol is:

Alice chooses an element g in $B_n$, four elements $a_1, b_1 \in LB_n$ and $c_2, d_2 \in RB_n$, and a collision-resistant Hash function $\Theta: B_n \rightarrow \{0, 1\}^k$, and computes $x = b_1 a_1 g c_2 d_2$. The public keys of Alice are $(B_n, LB_n, RB_n, g, x, \Theta)$, and the private keys are $b_1$ and $d_2$.

An authentication process is:

It is given that Alice is a prover and Bob is a verifier.

6.1) Bob chooses six elements $c_1, d_1, d_3 \in RB_n$ and $a_2, b_2, b_3 \in LB_n$, and the private keys are $b_2$ and $d_1$. Bob computes $$y = d_1 c_1 g a_2 b_2 \text{ and } w = d_3 c_1 x a_2 b_3,$$

uses (y, w) as challenge 1, and sends the challenge 1 to Alice;

6.2) Alice chooses two elements $b_4 \in LB_n$ and $d_4 \in RB_n$, computes $$z = b_4 a_1 y c_2 d_4 \text{ and } u = b_1^{-1} w d_2^{-1} = d_3 c_1 a_1 g c_2 a_2 b_3,$$

uses (z, u) as a response, and sends the response to Bob;

6.3) Bob computes $v = d_1^{-1} z b_2^{-1} = b_4 a_1 c_1 g a_2 c_2 d_4$, uses v as challenge 2, and sends the challenge 2 to Alice;

6.4) Alice computes $t = \Theta(b_4^{-1} v d_4^{-1}) = \Theta(a_1 c_1 g a_2 c_2)$, uses t as a commitment, and sends the commitment to Bob;

6.5) Bob computes $t' = \Theta(d_3^{-1} u b_3^{-1}) = \Theta(c_1 a_1 g c_2 a_2)$, and verifies whether t=t', and if t=t', Bob acknowledges an identity of Alice; otherwise, Bob refuses to acknowledge the identity.

4. Security Analysis

We may only provide the security of a key exchange protocol.

First, definitions of three determining problems of a group are provided.

a subgroup membership problem (subgroup membership problem or generalized word problem, GWP for short): given a subgroup H whose generator set is X in group G, whether any element g in G can be represented by a word on X is determined, that is, whether g is an element in H is determined.

an element decomposition search problem (decomposition search problem, DSP for short): given that g and h are two elements in group G. It is known that two elements c and d exist in G, so that h=cgd. Decide whether two elements c' and d' in G can be obtained, so that h=c'gd'.

a generalized element decomposition search problem (generalized decomposition search problem, GDSP for short): given that g and h are two elements in group G, and H and K are two subgroups in G. It is known that an element c of H and an element d of K exist, so that h=cgd. Decide whether an element c' of H and an element d' of K can be obtained, so that h=c'gd'.

The DSP can be solved easily by letting $c' = g^{-1}$ and d'=h. The decidability of the GDSP is not determined. However, for a decomposition equation h=cgd (c and d are unknown) in an infinite non-abelian group, it is impossible to certainly solve c and d. Because people do not know values of c and d, even if they enable h=c'gd' by using so-called "solutions" c' and d' which are obtained through computation by solving the GDSP problem, they also cannot determine whether c'=c and d'=d. Particularly, if c and d are separately taken from subgroups C and D with an unsolvable GWP problem, a solver not only cannot determine whether c'=c and d'=d, but also cannot determine whether c' and d' respectively are elements in C and D.

In core protocol 1, information that can be acquired by an attacker Eve by using disclosed information and an interactive process with Alice and Bob is as follows:

an infinite non-abelian group G and two subgroups A and B in G, so that for any a∈A and any b∈B, ab=ba is true, an element g in G, and the following elements in G:

$$y=d_1c_1gc_2d_2, x=b_1a_1ga_2b_2, z=b_3a_1d_1c_1gc_2d_2a_2b_4,$$
$$w=d_3c_1b_1a_1ga_2b_2c_2d_4, \text{ and}$$

$$v=b_3a_1c_1gc_2a_2b_4 \text{ and } u=d_3c_1a_1ga_2c_2d_4$$

It should be noted that Eve only knows x, y, z, w, u and v, but does not know corresponding decomposition expressions. If Eve can obtain $c_1'$, $c_2'\in B$, and $a_1'$, $a_2'\in A$ by solving the GDSP problem, so that $a_1'ga_2'=a_1ga_2$ and $c_1'gc_2'=c_1gc_2$, according to the multiplication commutativity of elements in A and B, it is obtained that $$c_1'a_1'ga_2'c_2'=c_1'a_1ga_2c_1'=a_1c_1'gc_2'a_2=a_1c_1gc_2a_2=K$$

and therefore, Eve needs to first obtain elements $a_1ga_2$ and $c_1gc_2$.

Because Eve does not know $a_1ga_2$ and $c_1gc_2$, she cannot strip $b_1$ and $b_2$ from x to obtain $a_1ga_2$, or strip $d_1$ and $d_2$ from y to obtain $c_1gc_2$. Eve knows $w=b_1ub_2$ and $z=d_1vd_2$ (but does not know $b_1$ and $b_2$, and $d_1$ and $d_2$). Now, even if Eve can solve the GDSP problem, to obtain $b_1'$, $b_2'\in A$, and $d_1'$, $d_2'\in B$, so that $b_1'ub_2'=b_1ub_2$ and $d_1'vd_2'=d_1vd_2$, she also cannot determine $b_1'=b_1$, $b_2'=b_2$, and $d_1'=d_1$, $d_2'=d_2$. Therefore, Eve still cannot strip $b_1$ and $b_2$ from x to obtain $a_1ga_2$, or strip $d_1$ and $d_2$ from y to obtain $c_1gc_2$.

Particularly, in a specific implementation solution, a braid group $B_n$ with n≥12 is taken as an infinite non-abelian group G, subgroups $LB_n$ and $RB_n$ of $B_n$ are taken as A and B respectively, and private keys $b_1$ and $b_2$, and private keys $d_1$ and $d_2$ are respectively chosen from a Mihailova subgroup $M_{LA}(H)$ of $LB_n$ and a Mihailova subgroup $M_{RA}(H)$ of $RB_n$. In the foregoing attack of Eve, she obtains $b_1'$, $b_2'\in LB_n$ and $d_1'$, $d_2'\in RB_n$ by solving the GDSP problem, so that $b_1'ub_2'=b_1ub_2$ and $d_1'vd_2'=d_1vd_2$. She must determine $b_1'=b_1$, $b_2'=b_2$ and $d_1'=d_1$, $d_2'=d_2$. Because $b_1, b_2\in M_{LA}(H)$ and $d_1, d_2\in M_{RA}(H)$, she must first determine whether $b_1'$, $b_2'\in M_{LA}(H)$, and whether $d_1'$, $d_2'\in M_{RA}(H)$. However, the GWP problems of $M_{LA}(H)$ and $M_{RA}(H)$ are unsolvable, so that Eve cannot carry out an attack even if she uses a quantum computational system.

In core protocol 2, information that can be acquired by an attacker Eve by using disclosed information and an interactive process with Alice and Bob is as follows:

an infinite non-abelian group G and two subgroups A and B in G, so that for any a∈A and any b∈B, ab=ba is true, an element g in G, and the following elements in G:

$$y=d_1c_1ga_2b_2, x=b_1a_1gc_2d_2, z=b_4a_1d_1c_1ga_2b_2c_2d_4,$$
$$w=d_3c_1b_1a_1gc_2d_2a_2b_3, \text{ and}$$

$$v=b_4a_1c_1ga_2c_2d_4 \text{ and } u=d_3c_1a_1gc_2a_2b_3$$

It should be noted that, Eve only knows x, y, z, w, u, and v, but does not know corresponding decomposition expressions. If Eve can obtain $c_1'$, $c_2'\in B$, and $a_1'$, $a_2'\in A$ by solving the GDSP problem, so that $a_1'gc_2'=a_1gc_2$ and $c_1'ga_2'=c_1ga_2$, according to the multiplication commutativity of elements in A and B, it is obtained that $$c_1'a_1'gc_2'a_2'=c_1'a_1gc_2c_1'=a_1c_1'ga_2'c_2=a_1c_1ga_2c_2=K$$

and therefore, Eve needs to first obtain elements $a_1gc_2$ and $c_1ga_2$.

Because Eve does not know $a_1gc_2$ and $c_1ga_2$, she cannot strip $b_1$ and $d_2$ from x to obtain $a_1gc_2$, or strip $d_1$ and $b_2$ from y to obtain $c_1ga_2$. Eve knows $w=b_1ud_2$ and $z=d_1vb_2$ (but does not know $b_1$ and $b_2$, and $d_1$ and $d_2$). Now, even if Eve can solve the GDSP problem, to obtain $b_1'$, $b_2'\in A$, and $d_1'$, $d_2'\in B$, so that $b_1'ud_2'=b_1ud_2$ and $d_1'vb_2'=d_1vb_2$, she also cannot determine $b_1'=b_1$, $b_2'=b_2$ and $d_1'=d_1$, $d_2'=d_2$. Therefore, Eve still cannot strip $b_1$ and $d_2$ from x to obtain $a_1gc_2$, or strip $d_1$ and $b_2$ from y to obtain $c_1ga_2$.

Particularly, in a specific implementation solution, a braid group $B_n$ with n≥12 is taken as an infinite non-abelian group G, subgroups $LB_n$ and $RB_n$ of $B_n$ are taken as A and B respectively, and private keys $b_1$ and $b_2$, and private keys $d_1$ and $d_2$ are respectively chosen from a Mihailova subgroup $M_{LA}(H)$ of $LB_n$ and a Mihailova subgroup $M_{RA}(H)$ of $RB_n$. In the foregoing attack of Eve, she obtains $b_1'$, $b_2'\in LB_n$ and $d_1'$, $d_2'\in RB_n$ by solving the GDSP problem, so that $b_1'ud_2'=b_1ud_2$ and $d_1'vb_2'=d_1vb_2$. She must determine $b_1'=b_1$, $b_2'=b_2$ and $d_1'=d_1$, $d_2'=d_2$. Because $b_1, b_2\in M_{LA}(H)$ and $d_1, d_2\in M_{RA}(H)$, she must first determine whether $b_1'$, $b_2'\in M_{LA}(H)$, and whether $d_1'$, $d_2'\in M_{RA}(H)$. However, the GWP problems of $M_{LA}(H)$ and $M_{RA}(H)$ are unsolvable, so that Eve cannot carry out an attack even if she uses a quantum computational system.

5. Choosing of a Parameter

In an exemplary embodiment, a braid group $B_n$ has an exponent of n≥12, subgroups in each protocol are $A=LB_n$ and $B=RB_n$, choosing of $a_1$, $a_2$, $c_1$, and $c_2$ needs to satisfy that their product $a_1a_2c_1c_2$ is not less than 256 bits, each of private keys $b_1$, $b_2$, $d_1$ and $d_2$ is not less than 256 bits, and each of protection layer elements $b_3$, $b_4$, $d_3$, and $d_4$ is not less than 128 bits.

It is particularly pointed out that, to resist the quantum computational attack, it is suggested that private keys $b_1$ and $b_2$, and $d_1$ and $d_2$ be respectively chosen from Mihailova subgroups $M_{LA}(H)$ and $M_{RA}(H)$ of the braid group B. Therefore, because of the unsolvability of the GWP of $M_{LA}(H)$ and $M_{RA}(H)$, as described in the security analysis, even if a quantum computational system is used, $b_1$ and $b_2$, and $d_1$ and $d_2$ also cannot be attacked.

The foregoing describes the method of establishing public key cryptographic protocols against the quantum computational attack according to the present invention, so as to help to understand the present invention. However, the implementation manners of the present invention are not limited by the foregoing embodiments, any variation, modification, replacement, combination, and simplification made without departing from the principle of the present invention shall be an equivalent replacement manner and fall within the protection scope of the present invention.

What is claimed is:

1. A method of implementing secure exchange of information over a communication link, comprising a method for generating a shared key, wherein the method for generating a shared key comprises the following steps:
    (11) establishing an infinite non-abelian group G and two subgroups A and B of G, so that for any a∈A and any b∈B, the equation ab=ba is true;
    (12) choosing, by a first communication terminal, an element g in G, wherein the first communication terminal chooses two elements $b_1$, $b_2\in A$ as private keys, and a second communication terminal chooses two elements $d_1$, $d_2\in B$ as private keys;
    (13) choosing, by the second communication terminal, two elements $c_1$, $c_2\in B$, computing $y=d_1c_1gc_2d_2$, and sending y to the first communication terminal;

(14) choosing, by the first communication terminal, four elements $a_1, a_2, b_3, b_4 \in A$, computing $$x=b_1a_1ga_2b_2 \text{ and } z=b_3a_1ya_2b_4=b_3a_1d_1c_1gc_2d_2a_2b_4,$$

and sending (x, z) to the second communication terminal;

(15) choosing, by the second communication terminal, two elements $d_3, d_4 \in B$, computing $$w=d_3c_1xc_2d_4=d_3c_1b_1a_1ga_2b_2c_2d_4$$

and $$v=d_1^{-1}zd_2^{-1}=d_1^{-1}b_3a_1d_1c_1gc_2d_2a_2\\b_4d_2^{-1}=b_3a_1c_1gc_2a_2b_4$$

and sending (w, v) to the first communication terminal;

(16) computing, by the first communication terminal, $$u=b_1^{-1}wb_2^{-1}=b_1^{-1}d_3c_1b_1a_1ga_2b_2c_2d_4b_2^{-1}=d_3c_1a_1ga_2c_2d_4,$$

and sending u to the second communication terminal; and

(17) computing, by the first communication terminal, $K_A=b_3^{-1}vb_4^{-1}=a_1c_1gc_2a_2$, and computing, by the second communication terminal, $K_B=d_3^{-1}ud_4^{-1}=c_1a_1ga_2c_2$;

because $a_1, a_2 \in A$, and $c_1, c_2 \in B$, $a_1$ and $c_1$ are separately commute with $a_2$ and $c_2$ in multiplication, so that the first communication terminal and the second communication terminal reach a shared key $K=K_A=K_B$;

exchanging information over the communication link between the first communication terminal and the second communication terminal based on the shared key.

2. The method of implementing secure exchange of information over the communication link according to claim 1, wherein the infinite non-abelian group G is a braid group, and the braid group has Mihailova subgroups with subgroup membership problem unsolvable, and the private key is chosen from the Mihailova subgroup;

a braid group $B_n$ with $n \geq 12$ is taken as the infinite non-abelian group G, and is a group defined by the following presentation:

$$B_n = \langle \sigma_1, \sigma_2, \ldots, \sigma_{n-1} | \sigma_i\sigma_j = \sigma_j\sigma_i, |i-j| \geq 2,\\ \sigma_i\sigma_{i+1}\sigma_i = \sigma_{i+1}\sigma_i\sigma_{i+1}, 1 \leq i \leq n-2 \rangle,$$

the braid group $B_n$ contains the following two subgroups: let $m = \lfloor n/2 \rfloor$ be a maximum integer not greater than $n/2$, and a left braid $LB_n$ and a right braid $RB_n$ of the braid group $B_n$ separately are:

$$LB_n = \langle \sigma_1, \sigma_2, \ldots, \sigma_{m-1} \rangle \text{ and}$$
$$RB_n = \langle \sigma_{m+1}, \sigma_{m+2}, \ldots, \sigma_{n-1} \rangle$$

that is, separately are subgroups generated by $\sigma_1, \sigma_2, \ldots, \sigma_{m-1}$ and $\sigma_{m+1}, \sigma_{m+2}, \ldots, \sigma_{n-1}$, and for any $a \in LB_n$ and any $b \in RB_n$, $ab = ba$ is true, $LB_n$ is taken as subgroup A of G, and $RB_n$ is taken as subgroup B of G;

when $n \geq 12$, $LB_n$ and $RB_n$, separately contain a subgroup isomorphic to $F_2 \times F_2$, that is, subgroups isomorphic to the direct product of two free groups with ranks being 2:

$$LA = \langle \sigma_{m-5}^2, \sigma_{m-4}^2, \sigma_{m-2}^2, \sigma_{m-1}^2 \rangle \leq LB_n$$

and $$RA = \langle \sigma_{m+1}^2, \sigma_{m+2}^2, \sigma_{m+4}^2, \sigma_{m+5}^2 \rangle \leq RB_n;$$

and then a finite presentation group H whose word problem is unsolvable and that is generated by two elements constructs a Mihailova subgroup $M_{LA}(H)$ of LA and a Mihailova subgroup $M_{RA}(H)$ of RA; the following is 56 generators of $M_{LA}(H)$, wherein $i=m-5$; and when $i=m+1$, 56 generators of $M_{RA}(H)$ can be obtained:

$$\sigma_i^2\sigma_{i+3}^2, \sigma_{i+1}^2\sigma_{i+4}^2, S_{ij}, T_{ij}, j=1,2,\ldots,27$$

and 27 $S_{ij}$s are:

$S_{i1}$: $(\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{12})^{-1}$ $\sigma_{i+1}^{-12}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$ $\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2$ $S_{i2}$: $(\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{10})^{-1}$ $\sigma_{i+1}^{-10}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$ $\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2$ $S_{i3}$: $(\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^8)^{-1}$ $\sigma_{i+1}^{-8}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2$ $S_{i4}$: $(\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^6)^{-1}$ $\sigma_{i+1}^{-6}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$ $\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2$ $S_{i5}$: $(\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^4)^{-1}$ $\sigma_{i+1}^{-4}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$ $\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2$ $S_{i6}$: $(\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$ $\sigma_i^{-4}\sigma_{i+1}^{16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{14})^{-1}$ $\sigma_{i+1}^{-14}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2$ -continued $S_{i,7}$: $(\sigma_i^2\sigma_{i+1}^4\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{12})^{-1}$
$\sigma_{i+1}^{-12}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2$ $S_{i,8}$: $(\sigma_i^2\sigma_{i+1}^6\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{10})^{-1}$
$\sigma_{i+1}^{-10}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2$ $S_{i,9}$: $(\sigma_i^2\sigma_{i+1}^8\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^8)^{-1}$
$\sigma_{i+1}^{-8}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2$ $S_{i,10}$: $(\sigma_i^2\sigma_{i+1}^{10}\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^6)^{-1}$
$\sigma_{i+1}^{-6}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2$ $S_{i,11}$: $(\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{16})^{-1}$
$\sigma_{i+1}^{-16}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2$ $S_{i,12}$: $(\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{14})^{-1}$
$\sigma_{i+1}^{-14}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2$ $S_{i,13}$: $(\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{12})^{-1}$
$\sigma_{i+1}^{-12}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2$ $S_{i,14}$: $(\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{10})^{-1}$
$\sigma_{i+1}^{-10}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2$ $S_{i,15}$: $(\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^8)^{-1}$
$\sigma_{i+1}^{-8}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2$ $S_{i,16}$: $(\sigma_{i+1}^{-6}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-20}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^6$ $S_{i,17}$: $(\sigma_{i+1}^{-4}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-20}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^4$ $S_{i,18}$: $(\sigma_i^{-4}\sigma_{i+1}^{-12}\sigma_i^2\sigma_{i+1}^2\sigma_i^{-2}\sigma_{i+1}^{12}\sigma_i^4\sigma_{i+1}^{-12}\sigma_i^{-2}\sigma_{i+1}^{-2}\sigma_i^2\sigma_{i+1}^{10}\sigma_i^{-2}\sigma_{i+1}^{-2}\sigma_i^2\sigma_{i+1}^2\sigma_i^{-4}\sigma_{i+1}^{-2}\sigma_i^2\sigma_{i+1}^{-2}\sigma_i^{-2}\sigma_{i+1}^4\sigma_i^4$
$\sigma_{i+1}^{-2}\sigma_i^{-2}\sigma_{i+1}^{-2}\sigma_i^2\sigma_{i+1}^2\sigma_i^{-4}\sigma_{i+1}^{-2}\sigma_i^2\sigma_{i+1}^{-2}\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-2}\sigma_i^2\sigma_{i+1}^{-2}\sigma_i^{-2}\sigma_{i+1}^{-18}\sigma_i^2$
$\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}(\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2)^2$
$\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2)^{-1}$
$(\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2)^{-2}\sigma_{i+1}^{-2}\sigma_i^{-2}\sigma_{i+1}^2\sigma_i^2\sigma_{i+1}^2\sigma_i^{-4}\sigma_{i+1}^{-2}\sigma_i^2\sigma_{i+1}^{-2}\sigma_i^{-2}\sigma_{i+1}^{-18}\sigma_i^2$
$\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}(\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2)^3$
$\sigma_i^{-4}\sigma_{i+1}^{-12}\sigma_i^2\sigma_{i+1}^2\sigma_i^{-2}\sigma_{i+1}^{12}\sigma_i^4\sigma_{i+1}^{-12}\sigma_i^{-2}\sigma_{i+1}^{-2}\sigma_i^2\sigma_{i+1}^{10}$ $S_{i,19}$: $(\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}$
$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}$
$\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,20}$: $(\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^2$
$\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-2}\sigma_i^2\sigma_{i+1}^2\sigma_i^{-2}\sigma_{i+1}^{-2}\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}$ -continued $\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^2\sigma_i^2\sigma_{i+1}^2\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^2\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,21}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^3$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^2\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$ $\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^2$ $\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^3\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,22}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^4$ $\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^3\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$ $\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^3$ $\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-2}\sigma_i^{-2}\sigma_{i+1}^{-2}\sigma_i^2\sigma_{i+1}^4\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^4\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,23}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^5$ $\sigma_i^{-4}\sigma_{i+1}^{-16}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6$ $\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^4$ $\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$ $\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^4$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^5\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,24}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^6$ $\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$ $\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^5$ $\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$ $\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^5$ $\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^6\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,25}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^7$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^6\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$ $\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^6$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^7\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,26}: (\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^8$ $(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^7$ $\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$ $\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^7$ $\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6(\sigma_i^{-4}\sigma_{i+1}^{-3}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3$ $(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^8\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ -continued $$S_{i,27}: (\sigma_i^{-4}\sigma_{i+1}^2\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$$
$$(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^8$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$$
$$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^8$$
$$\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^3$$
$$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2,$$

all $\sigma_i$s in the foregoing each $S_{ij}$ are replaced with $\sigma_{i+3}$s, and all $\sigma_{i+1}$s are replaced with $\sigma_{i+4}$s, to obtain corresponding 27 $T_{ij}$s, wherein j=1, 2, . . . , 27.

3. The method of implementing secure exchange of information over the communication link according to claim 2, wherein the braid group $B_n$ has an exponent of n≥12; the subgroup is $A=LB_n$ and $B=RB_n$; choosing of $a_1$, $a_2$, $c_1$, and $c_2$ satisfies that their product $a_1c_1ga_2c_2$ is not less than 256 bits; the private keys $b_1$, $b_2$, $d_1$, and $d_2$ are all not less than 256 bits; and each of protection layer elements $b_3$, $b_4$, $d_3$, and $d_4$ is not less than 128 bits.

4. A method of implementing secure exchange of information over a communication link, comprising a method for generating a shared key, wherein the method for generating a shared key comprises the following steps:

(11.1) establishing an infinite non-abelian group G and two subgroups A and B of G, so that for any a∈A and any b∈B, the equation ab=ba is true;

(12.1) choosing, by a first communication terminal, an element g in G, wherein the first communication terminal chooses two elements $b_{10}$∈A and $d_{20}$∈B as private keys, and a second communication terminal chooses two elements $b_{20}$∈A and $d_{10}$∈B as private keys;

(13.1) choosing, by the second communication terminal, two elements $a_{20}$∈A and $c_{10}$∈B, computing $y=d_{10}c_{10}ga_{20}b_{20}$, and sending y to the first communication terminal;

(14.1) choosing, by the first communication terminal, four elements $a_{10}$, $b_{40}$∈A and $c_{20}$, $d_{40}$∈B, computing $x=b_{10}a_{10}gc_{20}d_{20}$ and
$z=b_{40}a_{10}yc_{20}d_{40}=b_{40}a_{10}d_{10}c_{10}ga_{20}b_{20}c_{20}d_{40}$, and sending (x, z) to the second communication terminal;

(15.1) choosing, by the second communication terminal, two elements $b_{30}$∈A and $d_{30}$∈B, computing $w=d_{30}c_{10}xa_{20}b_{30}=d_{30}c_{10}b_{10}a_{10}gc_{20}d_{20}a_{20}b_{30}$ and $v=d_{10}^{-1}zb_{20}^{-1}=d_{10}^{-1}b_{40}a_{10}d_{10}c_{10}ga_{20}b_{20}c_{20}$
$d_{40}b_{20}^{-1}=b_{40}a_{10}c_{10}ga_{20}a_{20}c_{20}d_{40}$, and sending (w, v) to the first communication terminal;

(16.1) computing, by the first communication terminal, $u=b_{10}^{-1}wd_{20}^{-1}=b_{10}^{-1}d_{30}c_{10}b_{10}a_{10}gc_{20}d_{20}a_{20}$
$b_{30}d_{20}^{-1}=d_{30}c_{10}a_{10}gc_{20}a_{20}b_{30}$, and sending u to the second communication terminal; and (17.1) computing, by the first communication terminal, $K_A=b_{40}^{-1}vd_{40}^{-1}=a_{10}c_{10}ga_{20}c_{20}$, and computing, by the second communication terminal, $K_B=d_{30}^{-1}ub_{30}^{-1}=c_{10}a_{10}gc_2a_2$;

because $a_{10}$, $a_{20}$∈A, and $c_{10}$, $c_{20}$∈B, $a_{10}$ and $c_{10}$ are separately commute with $a_{20}$ and $c_{20}$ in multiplication, so that the first communication terminal and the second communication terminal reach a shared key $K=K_A=K_B$;

exchanging information over the communication link between the first communication terminal and the second communication terminal based on the shared key.

5. The method of implementing secure exchange of information over the communication link according to claim 4, wherein the infinite non-abelian group G is a braid group, and the braid group has Mihailova subgroups with subgroup membership problem unsolvable, and the private key is chosen from the Mihailova subgroup;

a braid group $B_n$ with n≥12 is taken as the infinite non-abelian group G, and is a group defined by the following presentation:

$$B_n = \langle \sigma_1, \sigma_2, \ldots, \sigma_{n-1} | \sigma_i\sigma_j = \sigma_j\sigma_i, |i-j| \geq 2,$$
$$\sigma_i\sigma_{i+1}\sigma_i = \sigma_{i+1}\sigma_i\sigma_{i+1}, 1 \leq i \leq n-2 \rangle,$$

the braid group $B_n$ contains the following two subgroups:

let $m = \lfloor n/2 \rfloor$ be a maximum integer not greater than n/2, and a left braid $LB_n$ and a right braid $RB_n$ of the braid group $B_n$ separately are:

$$LB_n = \langle \sigma_1, \sigma_2, \ldots, \sigma_{m-1} \rangle \text{ and}$$
$$RB_n = \langle \sigma_{m+1}, \sigma_{m+2}, \ldots, \sigma_{n-1} \rangle$$

that is, separately are subgroups generated by $\sigma_1, \sigma_2, \ldots, \sigma_{m-1}$ and $\sigma_{m+1}, \sigma_{m+2}, \ldots, \sigma_{n-1}$, and for any a∈$LB_n$ and any b∈$RB_n$, ab=ba is true, $LB_n$ is taken as subgroup A of G, and $RB_n$ is taken as subgroup B of G;

when n≥12, $LB_n$ and $RB_n$ separately contain a subgroup isomorphic to $F_2 \times F_2$, that is, subgroups isomorphic to the direct product of two free groups with ranks being 2:

$$LA = \langle \sigma_{m-5}^2, \sigma_{m-4}^2, \sigma_{m-2}^2, \sigma_{m-1}^2 \rangle \leq LB_n$$

and $$RA = \langle \sigma_{m+1}^2, \sigma_{m+2}^2, \sigma_{m+4}^2, \sigma_{m+5}^2 \rangle \leq RB_n;$$

and then a finite presentation group H whose word problem is unsolvable and that is generated by two elements constructs a Mihailova subgroup $M_{LA}(H)$ of LA and a Mihailova subgroup $M_{RA}(H)$ of RA; the following is 56 generators of $M_{LA}(H)$, wherein i=m−5; and when i=m+1, 56 generators of $M_{RA}(H)$ can be obtained:

$$\sigma_i^2\sigma_{i+3}^2, \sigma_{i+1}^2\sigma_{i+4}^2, S_{ij}, T_{ij}, j=1,2,\ldots,27$$

and 27 $S_{ij}$s are:

$$S_{i,1}: (\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{12})^{-1}$$
$$\sigma_{i+1}^{-12}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$$
$$\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2$$

$$S_{i,2}: (\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{10})^{-1}$$
$$\sigma_{i+1}^{-10}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$$
$$\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2$$

$$S_{i,3}: (\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{8})^{-1}$$
$$\sigma_{i+1}^{-8}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$$
$$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2$$

$$S_{i,4}: (\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{6})^{-1}$$
$$\sigma_{i+1}^{-6}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$$
$$\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2$$

$$S_{i,5}: (\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{4})^{-1}$$
$$\sigma_{i+1}^{-4}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^9$$
$$\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2$$

$$S_{i,6}: (\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{14})^{-1}$$
$$\sigma_{i+1}^{-14}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2$$

$$S_{i,7}: (\sigma_i^2\sigma_{i+1}^4\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{12})^{-1}$$
$$\sigma_{i+1}^{-12}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^4\sigma_i^4\sigma_{i+1}^{-2}\sigma_i^{-2}\sigma_{i+1}^{-2}\sigma_i^2$$

$$S_{i,8}: (\sigma_i^2\sigma_{i+1}^6\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{10})^{-1}$$
$$\sigma_{i+1}^{-10}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^6\sigma_i^4\sigma_{i+1}^{-2}\sigma_i^{-2}\sigma_{i+1}^{-2}\sigma_i^2$$

$$S_{i,9}: (\sigma_i^2\sigma_{i+1}^8\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{8})^{-1}$$
$$\sigma_{i+1}^{-8}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2$$

$$S_{i,10}: (\sigma_i^2\sigma_{i+1}^{10}\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^2(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^9$$
$$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{6})^{-1}$$
$$\sigma_{i+1}^{-6}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2$$

$$S_{i,11}: (\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{16})^{-1}$$
$$\sigma_{i+1}^{-16}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2$$

$$S_{i,12}: (\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{14})^{-1}$$
$$\sigma_{i+1}^{-14}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2$$

$$S_{i,13}: (\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{12})^{-1}$$
$$\sigma_{i+1}^{-12}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2$$

$$S_{i,14}: (\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{10})^{-1}$$
$$\sigma_{i+1}^{-10}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2$$

$$S_{i,15}: (\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2\sigma_{i+1}^{10}\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{8})^{-1}$$
$$\sigma_{i+1}^{-8}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-10}\sigma_i^2\sigma_{i+1}^2\sigma_i^{-2}\sigma_{i+1}^{10}\sigma_i^4\sigma_{i+1}^{-10}\sigma_i^{-2}\sigma_{i+1}^{-2}\sigma_i^2$$

$S_{i,16}$: $(\sigma_{i+1}^{-6}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-20}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^6$ $S_{i,17}$: $(\sigma_{i+1}^{-4}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-20}\sigma_i^2\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^4$ $S_{i,18}$: $(\sigma_1^{-4}\sigma_{i+1}^{-12}\sigma_i^2\sigma_{i+1}^2\sigma_i^{-2}\sigma_{i+1}^{12}\sigma_i^4\sigma_{i+1}^{-12}\sigma_i^{-2}\sigma_{i+1}^{-2}\sigma_i^2\sigma_{i+1}^{10}\sigma_i^{-2}\sigma_{i+1}^2\sigma_i^2\sigma_{i+1}^2\sigma_i^{-4}\sigma_{i+1}^{-2}\sigma_i^2\sigma_{i+1}^{-2}\sigma_i^{-2}\sigma_{i+1}^2\sigma_i^4$
$\sigma_{i+1}^{-2}\sigma_i^{-2}\sigma_{i+1}^2\sigma_i^2\sigma_{i+1}^2\sigma_i^{-4}\sigma_{i+1}^{-2}\sigma_i^2\sigma_{i+1}^{-2}\sigma_i^{-2}\sigma_{i+1}^2\sigma_i^4\sigma_{i+1}^{-2}\sigma_i^{-2}\sigma_{i+1}^2\sigma_i^2\sigma_{i+1}^2\sigma_i^{-4}\sigma_{i+1}^{-2}\sigma_i^2\sigma_{i+1}^{-2}\sigma_i^{-2}\sigma_{i+1}^{-18}\sigma_i^2$
$\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^2$
$\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2)^{-1}$
$(\sigma_1^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^{-2}\sigma_i^{-2}\sigma_{i+1}^{-2}\sigma_i^2\sigma_{i+1}^2\sigma_i^2\sigma_{i+1}^{-4}\sigma_i^{-2}\sigma_{i+1}^2\sigma_i^2\sigma_{i+1}^{-2}\sigma_i^{-2}\sigma_{i+1}^{-18}\sigma_i^2$
$\sigma_{i+1}^2\sigma_i^{-2}\sigma_{i+1}^{20}\sigma_i^4\sigma_{i+1}^{-20}\sigma_i^{-2}\sigma_{i+1}^{-2}\sigma_i^2\sigma_{i+1}^{20}(\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2)^8$
$\sigma_i^{-4}\sigma_{i+1}^{-12}\sigma_i^2\sigma_{i+1}^2\sigma_i^{-2}\sigma_{i+1}^{12}\sigma_i^4\sigma_{i+1}^{-12}\sigma_i^{-2}\sigma_{i+1}^{-2}\sigma_i^2\sigma_{i+1}^{10}$ $S_{i,19}$: $(\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}$
$\sigma_1^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}$
$\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,20}$: $(\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^2$
$\sigma_1^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2$
$\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16}\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}$
$\sigma_i^{-4}\sigma_{i+1}^{-2}\sigma_i^2\sigma_{i+1}^2\sigma_i^{-2}\sigma_{i+1}^2\sigma_i^4\sigma_{i+1}^{-2}\sigma_i^{-2}\sigma_{i+1}^{-2}\sigma_i^2\sigma_{i+1}^2\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^2\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,21}$: $(\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^3$
$\sigma_1^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^2\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^2$
$\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-6}\sigma_i^2\sigma_{i+1}^2\sigma_i^{-2}\sigma_{i+1}^6\sigma_i^4\sigma_{i+1}^{-6}\sigma_i^{-2}\sigma_{i+1}^{-2}\sigma_i^2\sigma_{i+1}^6$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^3\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,22}$: $(\sigma_{i+1}^{-4}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^{18}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^4$
$\sigma_1^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^3\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2)^{-1}$
$\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14}(\sigma_i^{-4}\sigma_{i+1}^{-14}\sigma_i^2\sigma_{i+1}^2\sigma_i^{-2}\sigma_{i+1}^{14}\sigma_i^4\sigma_{i+1}^{-14}\sigma_i^{-2}\sigma_{i+1}^{-2}\sigma_i^2\sigma_{i+1}^{14})^3$
$\sigma_i^{-4}\sigma_{i+1}^{-4}\sigma_i^2\sigma_{i+1}^2\sigma_i^{-2}\sigma_{i+1}^4\sigma_i^4\sigma_{i+1}^{-4}\sigma_i^{-2}\sigma_{i+1}^{-2}\sigma_i^2\sigma_{i+1}^4\sigma_i^{-4}\sigma_{i+1}^{-8}\sigma_i^2\sigma_{i+1}^2\sigma_i^{-2}\sigma_{i+1}^8\sigma_i^4\sigma_{i+1}^{-8}\sigma_i^{-2}\sigma_{i+1}^{-2}\sigma_i^2\sigma_{i+1}^8$
$(\sigma_i^{-4}\sigma_{i+1}^{-16}\sigma_i^2\sigma_{i+1}^2\sigma_i^{-2}\sigma_{i+1}^{16}\sigma_i^4\sigma_{i+1}^{-16}\sigma_i^{-2}\sigma_{i+1}^{-2}\sigma_i^2\sigma_{i+1}^{16})^4\sigma_i^{-4}\sigma_{i+1}^{-18}\sigma_i^2\sigma_{i+1}^2\sigma_i^{-2}\sigma_{i+1}^{18}\sigma_i^4\sigma_{i+1}^{-18}\sigma_i^{-2}\sigma_{i+1}^{-2}\sigma_i^2\sigma_{i+1}^2$ $S_{i,23}$: (complex braid group expression involving $\sigma_i$ and $\sigma_{i+1}$ with various exponents)

$S_{i,24}$: (complex braid group expression)

$S_{i,25}$: (complex braid group expression)

$S_{i,26}$: (complex braid group expression)

$S_{i,27}$: (complex braid group expression)

all $\sigma_i$s in the foregoing each $S_{ij}$ are replaced with $\sigma_{i+3}$s, and all $\sigma_{i+1}$s are replaced with $\sigma_{i+4}$s, to obtain corresponding 27 $T_{ij}$s, wherein j=1, 2, ..., 27.

6. The method of implementing secure exchange of information over the communication link according to claim 5, wherein the braid group $B_n$ has an exponent of n≥12; the subgroup is $A=LB_n$ and $B=RB_n$; choosing of $a_{10}$, $a_{20}$, $c_{10}$ and $c_{20}$ satisfies that their product $a_{10}c_{10}ga_{20}c_{20}$ is not less than 256 bits; the private keys $b_{10}$, $b_{20}$, $d_{10}$, and $d_{20}$ are all not less than 256 bits; and each of protection layer elements $b_{30}$, $b_{40}$, $d_{30}$, and $d_{40}$ is not less than 128 bits.

\* \* \* \* \*